Patented Jan. 2, 1934

1,942,090

UNITED STATES PATENT OFFICE 1,942,090

PROCESS OF MOLDING CELLULOSE DERIVATIVES

Arthur Eichengrün, Charlottenburg, Germany, assignor to Celanese Corporation of America, a corporation of Delaware No Drawing. Application June 4, 1928, Serial No. 282,878, and in Germany May 31, 1927

1 Claim. (Cl. 18—51)

This invention relates to a process of working up cellulose derivatives into plastic masses, powder adapted to be pressed, foils, filaments and the like.

Heretofore cellulose derivatives soluble in organic solvents, especially cellulose esters and cellulose ethers have been worked up by bringing them into solution or into a condition of a so-called stiff solution by means of solvents. Solutions are understood to mean a gelatinous liquid which is more or less labile or flowable according to the amount of solvent present, or which is in the form of a viscous solution which is even of dough-like consistency if necessary.

Solutions of desired concentration can be spread or poured upon smooth surfaces, and upon evaporation of the solvent produce fully homogeneous film-like layers.

The "stiff solutions" differ from the true solutions in that they cannot be poured and are not flowable and in general cannot be spread, but form gelatin-like masses that can be cut, and which hold the solvent so tenaciously that the same does not occur as a liquid in appearance and cannot be pressed out of the gelatinous mass in a liquid condition, but can only be separated by evaporation—a process which requires a long time amounting to days, weeks or even months according to the thickness of the gelatinous layer.

It has been now found that there is a third phase of mode of action of solvents upon cellulose derivatives, in which neither a solutioning nor gelatinization takes place but only a swelling or rather an incipient swelling. This condition is characterized in that the structure of the cellulose derivative is not fully destroyed, as in the case of the use of solvents, but is only changed. The volume of the individual particles becomes more or less increased and the cellulose compound is caued to become capable of reaction or absorption. Particularly to capability of taking up of pigments, filling materials and softening agents is increased, without the necessity of the occurrence of a solution in the latter.

The swelling agents clearly differ from non-solvents, since these cause no absorption of the softening agent, so that with the use of non-solvents, for example, benzine, under like conditions, only a non-homogeneous mixture of cellulose derivative particles, filling material, pigments and the like results, which mixture is not reacted upon and which is not capable of being further worked, while the softening agents remain dissolved in the liquid and can be decanted or pressed off with the same.

On the other hand, solvents differ from the swelling agents, in that they are fully absorbed by the cellulose derivative and form, according to the amount of solvent, freely flowing solutions which can be dried only by evaporation of the solvent, or gelatinous pastes which hold the solvent firmly bound therein and which give off the solvent only slowly, and even with a large amount of heating only with the formation of bubbles or blisters. For this reason the drying of such pastes or plastic masses which have been formed by means of solvents of mixture containing non-solvents (e. g. according to German Patent 238,348) must be performed at lower temperatures and for this reason the drying takes weeks and months; and on the other hand in the working of molding powder which has been made with solvents, a drastic drying must be performed in order to remove the last traces of solvents (e. g. according to German Patent 393,873) before the working in the press molds, because otherwise the pressed articles bulge out in the molds or distort after removal from the mold.

It is just in this respect wherein the most important advantage of the present invention lies, since the fine or large particles of material made in accordance with this invention can, without previous drastic drying, be pressed in hot molds or may be extruded through nozzles into such molds, or may be pressed through round or profiled openings or slits or may be rolled between calender rolls, without the adhering swelling agents in any way slowing down the working process or the drying process.

On the contrary the presence of small amounts of adhering swelling agent considerably increases the workability of the masses, so that they may be worked at appreciably lower temperatures (as those which must be used for example in the processes of German Patents 395,104, 395,083, 395,084, 352,910, 441,023 and 445,308), and even materials which contain no softening agent whatever may be pressed at low temperatures, and because of this after the pressing have great heat stability and high insulating properties which have not been heretofore attainable.

The characteristic differences between solvents, non-solvents and swelling agents can perhaps be made clear from the following definitions.

Solvents are such liquids that convert the cellulose derivative into a fully homogeneous condition which may be freely flowing, flowable or pasty according to the amount of solvent employed. The solvent can be separated only by volatilization or distillation, but cannot be separated by pressing.

Non-solvents are such liquids which wet the cellulose derivative, however they exert neither a chemical nor physical action thereon.

Swelling agents are such liquids which change the structure of the cellulose derivative by their action, whereby the degree of swelling is not influenced by the amount of solvent employed; that is the cellulose derivative is converted into exactly the same swollen condition with either a small amount or a large amount of swelling agent, and the excess of swelling agent likely to be present can be decanted or pressed off without causing a change in the behavior or properties of the swollen cellulose derivative, while an excess of solvent cannot be separated.

The further working of the swollen material comprises mixing therewith plasticizing agents or filling material if necessary, and indeed the latter may be added in amounts of several 100%'s, or the swollen material may be mixed with both plasticizers and filling material. In this manner there results a more or less dry powder, which if necessary may be freed of the greatest part of the swelling agent that may adhere by pressing or subsequent drying, and without further treatment is suitable to be placed in pressing molds and to be pressed into molded articles.

The extrusion or folding up of the material to form filaments, ribbons, bands, foils, etc., which may if desired then be further pressed, can be as readily performed as the pressing in molds or the extrusion through nozzles into molds.

For the preparation of the swollen material it is not necessary to use only a single swelling agent. As is understood there can be used a mixture of swelling agents. For instance comminuted and dry plastic masses, a molding powder prepared in another manner, or waste from molded articles or sheets can be swollen in the above described manner and then may be further worked up by any of the above described processes.

With reference to the use of swelling agents, the following further explanation is given.

Cellulose esters and cellulose ethers exhibit characteristic swelling phenomena just as they have different solubility stages in the case of the action of solvents. The degree of swelling differs with the different cellulose derivatives and may also depend on temperature and pressure.

For example, so different are the slightly saponified cellulose acetates from the highly saponified cellulose acetates, that the former are soluble in ethyl acetate while the latter merely swell. Cellulose triacetates swell in pyridin in characteristic manner, the hydroacetates become dissolved therein.

In every case the above described process is useful to convert the cellulose compound in such condition that it renders it in a form wherein it is capable of taking up or absorbing the softening agents, filling materials, etc. without the previous occurrence of a solution.

The invention will hereafter be explained with reference to the accompanying examples.

*Example 1*

500 grams methylene chloride are poured over 100 grams acetone-soluble cellulose acetate for which it is a non-solvent and the mixture is left to stand for a few hours. The initially unaltered cellulose acetate gradually swells and becomes translucent without altering its structure. The methylene chloride is thereupon decanted and 10 grams alcohol are added to the cellulose acetate and the mass is thoroughly agitated. The structure of the cellulose acetate soon disappears and a viscous syrup is obtained, the mixture of methylene chloride and alcohol being a solvent for the cellulose acetate. This is kneaded with 20 grams of triacetin, which is a plastifying agent, and 75 grams of powdered talc, whereby a hard, brittle, solidified mass is obtained which can be easily disintegrated by mechanical means and is preferably comminuted by rolling between hot rollers to form thin, easily breakable sheets. The coarser comminuted mass is filled into hot steel molds and is therein pressed into formed pieces or it is extruded through openings from a heated hollow cylinder by means of a ram, into molds. In such case the molds are preferably so constructed that hollow spaces are formed in the walls through which cold water is allowed to flow for the purpose of effecting a rapid solidification of the extruded mass.

*Example 2*

500 grams alcohol are poured upon 100 grams benzyl cellulose which remains insoluble therein. Thereupon the alcohol is decanted and 25 grams benzol, which is a solvent, are added, whereupon the mass is thoroughly agitated and heated. A highly viscous paste-like mass is soon obtained which is introduced into slightly heated press cylinders and is extruded under pressure through fine spinning nozzles. The threads, which only contain small amounts of solvent, immediately solidify and can be immediately spun.

*Example 3*

100 grams of cellulose hydroacetate are heated to 70° C., with a mixture of 300 grams trichlorethylene and 200 grams alcohol until a solution is obtained since this mixture is a solvent at such temperatures. On cooling the solution separates out a gelatinous mass since at lower temperatures the mixture of trichlorethylene and alcohol is a non-solvent, and the excess of this mixture is decanted and the cellulose acetate separated out in a gelatinous form is strongly heated with 50 grams phthalic acid ester, which is a plastifying agent, whilst stirring. A viscous solution is formed which on cooling solidifies to a plastic mass which can be transformed by rolling between profiled rollers, into thin sheets of flat filaments or bands. Alternatively the solidified mass may be treated in the usual manner in a block-press and the uniform blocks thus obtained are cut into sheets.

I claim:—

Process of preparing products containing a derivative of cellulose comprising swelling the derivative of cellulose in an excess swelling agent for the same, removing the excess of swelling agent not absorbed therein, adding a plasticizer thereto and molding the same under heat and pressure.

ARTHUR EICHENGRÜN.